United States Patent
Nguyen et al.

(10) Patent No.: US 12,488,223 B2
(45) Date of Patent: Dec. 2, 2025

(54) FEDERATED LEARNING FOR TRAINING MACHINE LEARNING MODELS

(71) Applicant: International Business Machines Corporation, Armonk, NY (US)

(72) Inventors: Lam Minh Nguyen, Ossining, NY (US); Dzung Tien Phan, Pleasantville, NY (US); Jayant R. Kalagnanam, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1016 days.

(21) Appl. No.: 17/557,096

(22) Filed: Dec. 21, 2021

(65) Prior Publication Data

US 2023/0196081 A1  Jun. 22, 2023

(51) Int. Cl.
  *G06N 3/047* (2023.01)
  *G06N 3/045* (2023.01)

(52) U.S. Cl.
  CPC ............. *G06N 3/047* (2023.01); *G06N 3/045* (2023.01)

(58) Field of Classification Search
  CPC ............................... G06N 3/045; G06N 3/047
  See application file for complete search history.

(56) References Cited

U.S. PATENT DOCUMENTS

| | | | |
|---|---|---|---|
| 10,885,434 B2 | 1/2021 | Temam | |
| 2018/0276821 A1 | 9/2018 | Lin | |
| 2020/0234082 A1* | 7/2020 | Toda | ........................ G06N 3/08 |
| 2020/0380340 A1 | 12/2020 | Blanchard | |
| 2021/0073678 A1 | 3/2021 | Chu | |
| 2021/0097439 A1 | 4/2021 | Vodencarevic | |
| 2021/0142108 A1 | 5/2021 | Huang | |
| 2021/0158216 A1* | 5/2021 | Du | ........................ G06N 20/00 |

(Continued)

FOREIGN PATENT DOCUMENTS

| CN | 111052155 A | 4/2020 |
|---|---|---|
| CN | 111221646 A | 6/2020 |

(Continued)

OTHER PUBLICATIONS

Rahul et.al, LipschitzLR: Using theoretically computed adaptive learning rates for fast convergence, Aug. 1, 2020 (Year: 2020).*

(Continued)

*Primary Examiner* — Alexey Shmatov
*Assistant Examiner* — Duy T Diep
(74) *Attorney, Agent, or Firm* — Stephen R. Yoder

(57) ABSTRACT

An approach to federated learning of a machine learning model may be provided. The approach may include broadcasting hyperparameters of a machine learning model to one or more client computing devices from a primary device associated with an outer loop or an inner loop. A gradient for the loss function may be calculated at the client device if previous gradients have been sufficiently large. If gradients exceeds a threshold, the client can send the mini-batch of gradients or the difference of the mini-batch of gradients back to the primary device. A search direction may be calculated based on the full gradient of the loss function for an outer loop or the mini-batch of gradient differences for an inner loop. A learning rate step may be calculated from the search direction. The hyperparameter may be updated for the inner loop based on the learning rate.

15 Claims, 6 Drawing Sheets

(56) References Cited

U.S. PATENT DOCUMENTS

| | | | |
|---|---|---|---|
| 2021/0174205 A1 | 6/2021 | Rosa | |
| 2021/0343021 A1 | 11/2021 | Jiang | |
| 2022/0261648 A1* | 8/2022 | Bhalgat | G06N 3/084 |

FOREIGN PATENT DOCUMENTS

| | | |
|---|---|---|
| CN | 111882060 A | 11/2020 |
| CN | 111814968 B | 1/2021 |
| CN | 111709533 B | 3/2021 |
| CN | 112232528 B | 3/2021 |
| CN | 112580815 A | 3/2021 |
| CN | 112598127 A | 4/2021 |
| CN | 112862111 A | 5/2021 |
| TW | 201947466 A | 12/2019 |
| WO | 2021222136 A1 | 11/2021 |

OTHER PUBLICATIONS

Defazio et al., "SAGA: A Fast Incremental Gradient Method With Support for Non-Strongly Convex Composite Objectives", NIPS 2014, 9 pages, <https://proceedings.neurips.cc/paper/2014/file/ede7e2b6d13a41ddf9f4bdef84fdc737-Paper.pdf>.

Duchi et al., "Adaptive Subgradient Methods for Online Learning and Stochastic Optimization", Journal of Machine Learning Research 12 (2011), 2121-2159, Submitted Mar. 2010; Revised Mar. 2011; Published Jul. 2011, <https://jmlr.org/papers/volume12/duchi11a/duchi11a.pdf>.

Johnson et al., "Accelerating Stochastic Gradient Descent using Predictive Variance Reduction", NIPS 2013, 9 pages, <https://papers.nips.cc/paper/2013/file/ac1dd209cbcc5e5d1c6e28598e8cbbe8-Paper.pdf>.

Kingma et al., "Adam: A Method for Stochastic Optimization", Published as a conference paper at ICLR 2015, arXiv:1412.6980v9 [cs.LG] Jan. 30, 2017, 15 pages.

Mell et al., "The NIST Definition of Cloud Computing", Recommendations of the National Institute of Standards and Technology, NIST Special Publication 800-145, Sep. 2011, 7 pages.

Nguyen et al., "SARAH: A Novel Method for Machine Learning Problems Using Stochastic Recursive Gradient", ICML 2017, 9 pages, <http://proceedings.mlr.press/v70/nguyen17b/nguyen17b.pdf>.

Pham et al., "ProxSARAH: An Efficient Algorithmic Framework for Stochastic Composite Nonconvex Optimization", Journal of Machine Learning Research 21 (2020) 1-48, Submitted Mar. 2019; Revised Feb. 2020; Published May 2020, <https://www.jmlr.org/papers/volume21/19-248/19-248.pdf>.

Robbins et al., "A Stochastic Approximation Method", The Annals of Mathematical Statistics, 1951, <https://projecteuclid.org/journals/annals-of-mathematical-statistics/volume22/issue-3/A-Stochastic-Approximation-Method/10.1214/aoms/1177729586.full>, 8 pages.

"Notification of Transmittal of the International Search Report and the Written Opinion of the International Searching Authority, or the Declaration", From the International Searching Authority, Applicant's or agent's file reference: PF221070PCT, International application No. PCT/CN2022/131705, International filing date: Nov. 14, 2022, Date of mailing: Jan. 9, 2023, 10 pgs.

\* cited by examiner

FEDERATED LEARNING FOR TRAINING MACHINE LEARNING MODELS

BACKGROUND OF THE INVENTION

The present invention relates generally to the field of machine learning, more specifically, to distributed training of large scale deep neural networks and machine learning models through variance-reduced stochastic gradient descent.

In many supervised learning tasks, the training data represents an underlying distribution. The goal of a machine learning is to learn a predictive model from the data. In many cases linear regression or logistic regression is used to train a machine learning model. Included in learning the predictive model parameters, empirical risk optimization is widely used to optimize training of the model parameters. In deep neural networks, first order methods include gradient descent, stochastic gradient descent, and variance reduction methods. Recently, variance reduction methods have produced state of the art performance results for strong convex and non-convex functions.

SUMMARY

Embodiments of the present disclosure include a computer-implemented method, computer program product, and a system for federated learning for deep neural networks and machine learning models. Embodiments may include initializing one or more machine learning model parameters for an outer loop update. Embodiments may also include, broadcasting the one or more machine learning model parameters to a plurality of clients. Embodiments may also include, determining a gradient for the one or more machine learning model parameters from the loss function at the plurality of clients. Embodiments may also include, responsive to the gradient being above a threshold, returning the gradient to the server. Embodiments may also include, determining the condition for invoking an inner loop based on the magnitude of the search directions in the inner loop and outer loop. Embodiments may also include, determining the search direction based on the full gradient for an outer loop and the mini-batch of gradient differences for an inner loop. Embodiments may also include, averaging the search directions for all clients for an outer loop update. Embodiments may also include, responsive to the squared norm of the updated search direction of all the clients being greater or equal than the squared norm of an initial search direction multiplied by a predetermined factor between 0 and 1 and the number of inner iterations is less than or equal a predetermined maximum inner loop size, determining a learning rate of the inner loop for the machine learning model, based, at least in part, on the updated search direction. Embodiments may also include, update the one or more machine learning model parameters of the inner loop based, at least in part, on the search direction and the learning rate.

The above summary is not intended to describe each illustrated embodiment of every implementation of the present disclosure.

Figure 1:
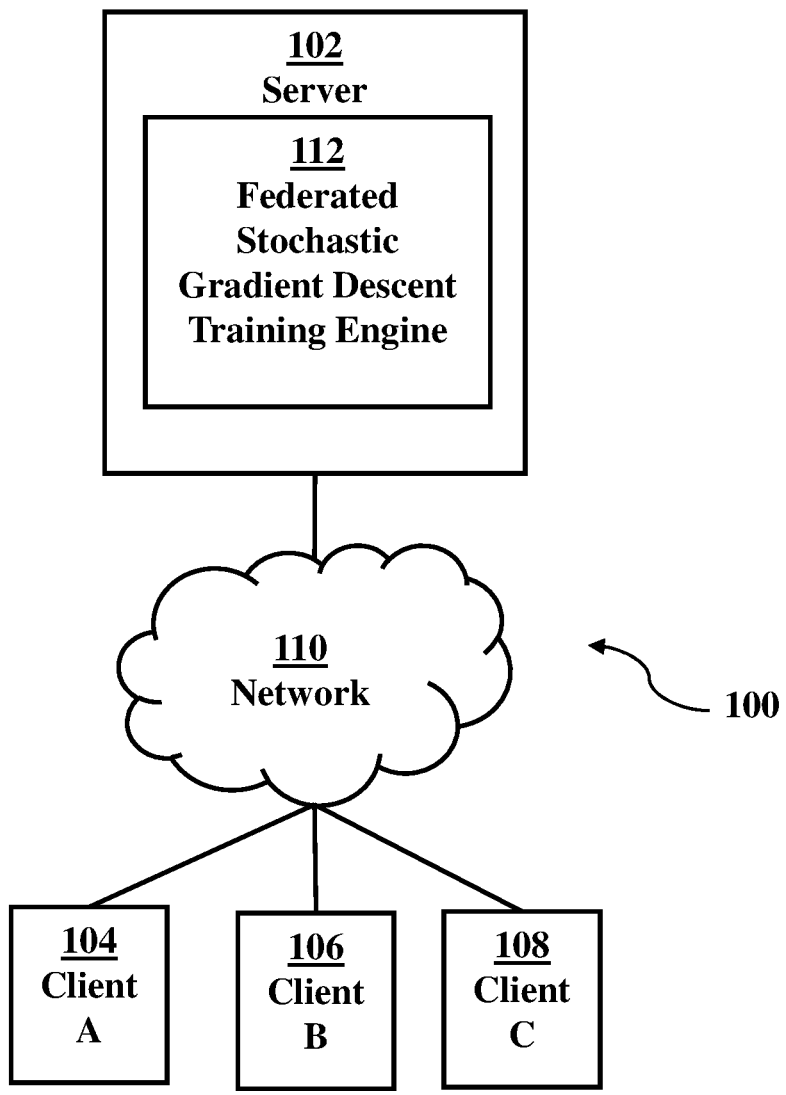
FIG. 1 is a functional block diagram generally depicting a federated deep neural network learning environment 100, in accordance with an embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The embodiments depicted provide for an approach to training machine learning models using federated learning by optimizing a loss function. In many supervised machine learning tasks, training data is provided which represents an underlying distribution. The goal is to train a predictive model using the training data. In many cases, linear regression, logistic regression, and deep learning are used as the predictive model and include parameters which must be trained. In learning the model parameters, empirical risk minimization is a widely used optimization framework. Embodiments of the present invention may provide an efficient optimization framework for learning model parameters.

In many machine learning models, such as deep neural networks, the number of component functions to determine is large, causing gradient descent to be an inefficient and challenging optimization problem. Deep neural networks may have applications such as computer vision (e.g., image classification) and natural language processing (e.g., language translation, word embedding, word recognition). Methods of training deep neural networks may include gradient descent, stochastic gradient methods, and variance reduction methods. Stochastic gradient methods and variance reduction methods are algorithms which attempt to reduce the computational resources required compared to conventional gradient descent when optimizing the loss function for deep neural networks.

In an embodiment, federated learning may be utilized for calculating gradients and passing information during the optimization process. Benefits of federated learning over previous methods may include better balancing and utilization of computing resources during optimization. Federated learning can also lead to faster convergence to the minimum through the load balancing and reduction of redundant tasks. Further, federated learning can increase privacy and prevent unneeded exposure of data, by preventing redundant tasks and reducing the overall number of steps necessary to come to a convergence.

Embodiments of the current invention may include a system for federated learning for machine learning models, such as large-scale deep neural networks, by using variance-reduced stochastic gradient descent. Additionally, embodiments may include calculating search direction for updating the parameters of machine learning models. Embodiments may include dynamically updating the step size of the learning rate based on the quality of the solution or gradients of the optimization process. Embodiments may include message passing strategy in the distributed training environment. Further, embodiments may utilize current and past calculated gradient estimates causing updates to be skipped, or layers within a deep neural network to be skip updated.

In an embodiment, optimization may consist of an outer loop and an inner loop. An outer loop is an entire iteration of an optimization, in which a full gradient is calculated and applied to the hyperparameters or weights of every node in the deep neural network. An inner loop includes a mini-batch gradient calculation, a learning rate update step or specific tasks within the neural network. An inner loop can be calculated at one or more clients within the federated learning framework.

In an embodiment, a primary server may pass broadcast specific inner loops to clients. The clients can calculate a gradient for model parameters over a subset of its dataset when it is assigned. If the gradient is below some threshold, the client can return a null or zero vector back to the primary server. The primary server may end the inner loop and continue broadcasting other inner loops to other clients allowing the completion of the outer loop. It should be noted, embodiments of the present invention may utilize one or more variance reduction methods (e.g., SARAH, NC-SARAH, SARAH++, SARAH ADAPTIVE, SPIDER, SpiderBoost) to obtain efficient approximate solutions for finite-sum smooth minimization applications.

FIG. 1 is a functional block diagram generally depicting federated learning environment 100 for training deep neural networks and machine learning models. Federated learning environment 100 comprises federated stochastic gradient descent training engine 112 operational on server 102, client A 104, client B 106, client C 108, and network 110.

Server 102, client A 104, client B 106, and client C 108 can be a standalone computing device, a management server, a web server, a mobile computing device, or any other electronic device or computing system capable of receiving, sending, and processing data. In other embodiments, server 102, client A 104, client B 106, and client C 108 can represent a server computing system utilizing multiple computers as a server system. In another embodiment, server 102, client A 104, client B 106, and client C 108 can be a laptop computer, a tablet computer, a netbook computer, a personal computer, a desktop computer, or any programmable electronic device capable of communicating with other computing devices within federated learning environment 100 via network 110 for training deep neural networks and machine learning models.

In another embodiment, server 102, client A 104, client B 106, and client C 108 represents a computing system utilizing clustered computers and components (e.g., database server computers, application server computers, etc.) that can act as a single pool of seamless resources when accessed within federated learning environment 100 for training deep neural networks and machine learning models. Server 102, client A 104, client B 106, and client C 108 can include internal and external hardware components, as depicted and described in further detail with respect to FIG. 4. It should be noted, while only server 102 is shown in FIG. 1, multiple computing devices can be present within federated learning environment 100. In an example, server 102 can be a part of a cloud server network in which a computing device (not shown) connected to network 110 can access server 102 (e.g., the internet). Additionally, while FIG. 1 shows three clients (i.e., Client A 104, client B 106, and client C 108), any number of clients can be within federated learning environment 100 (e.g., 1, 2, n . . . n+1) and connected to other computing devices via network 110.

Federated stochastic gradient descent training engine 112 is a computer program that can optimize model parameters for deep neural network and machine learning models. In an embodiment, federated learning environment 100 can have a primary version of federated stochastic gradient descent training engine 112 on server 102 and secondary versions of federated stochastic gradient descent training engine 112 on client A 104, client B, and client C108 that receive commands from the primary version on server 102.

In another embodiment, federated stochastic gradient descent training engine 112 can assign tasks to a computing device (e.g., client B 106) with the least resource utilization and assign inner loops to clients based on the quality of previously calculated gradients (e.g., if the inner loop assigned to client C 108 is at the expected minimum, federated gradient descent training engine 112 can assign a different training inner loop to client C 108).

Network 110 can be a local area network (LAN), a wide area network (WAN) such as the Internet, or a combination of the two, and can include wired, wireless, or fiber optic connections. In general, network 110 can be any combination of connections and protocols that will support communications between server 102, client A 104, client B 106, client C 108, and other computing devices (not shown).

Figure 2:
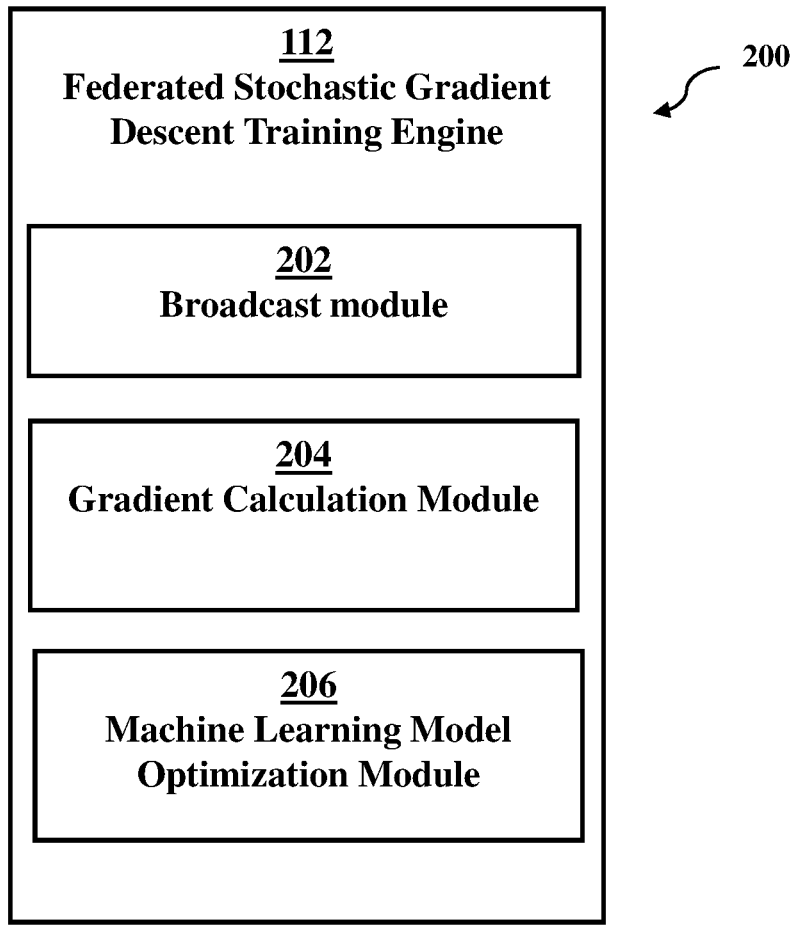
FIG. 2 is a diagram generally depicting federated stochastic gradient descent training engine 112, in accordance with an embodiment of the present invention.

FIG. 2 is a functional block diagram 200 depicting federated stochastic gradient descent training engine 112. Shown operational on federated stochastic gradient descent training engine 112 is broadcast module 202, gradient calculation module 204, and machine learning model optimization module 206.

Broadcast module 202 is a computer program that can be configured to broadcast weights or parameters from machine learning models or deep neural networks to one or more clients. For example, broadcast module 202 can broadcast a weight from the most recent iteration of a machine learning model training from server 102 to client B 106.

In an embodiment, broadcast module 202 can send a gradient that is above a threshold from a client to a primary computing device. For example, client B 106 can calculate a gradient for weights from the current training iteration. Broadcast module 202 can send the gradient back to the primary device from the client device. In another example, broadcast module 202 can send back a null or zero vector to the primary device if the calculated gradient is below a threshold.

In an embodiment, broadcast module 202 can send hyperparameters for a machine learning model inner loop to a client and detect if the client's computing resources are over a threshold utilization amount (i.e., overutilized) or below a threshold utilization amount (i.e., underutilized). For example, if broadcast module 202 assigns inner loop A to a client and the client is a mobile computing device, the mobile computing device may have other programs running which are using memory and processor capabilities. Because this will slow down the inner loop calculations, broadcast module 202 may reassign part or all of inner loop A to another computing device with more available computing resources. Broadcast module 202 may also reassign a smaller inner loop to the computing device, thereby ensuring an efficient use of the computing resources. Broadcast module 202 can also broadcast the weight of the current inner loop iteration and the weight previous inner loop iteration to one or more client computing devices.

Gradient calculation module 204 is a computer program that can be configured to calculate a gradient for a weight or hyper parameter. For example, a client device can receive one or more weights for a node in a deep neural network. A gradient can be calculated for the node based on the weight. In another example, if one or more previous gradients have been calculated by the client for the inner loop, gradient calculation module 204 can calculate:

$$\nabla f_i(w_0^{(s)})$$

where i is the client, w is the weight, 0 represents the initial weight of the inner round, and s represents the number of iterations of the outer round.

In an embodiment, gradient calculation module 204 can be configured to determine the gradient of the current inner loop minus the gradient of the previous inner loop. For example, gradient calculation module 204 can sample a random client. If the previous gradients of the client are above a threshold, gradient calculation module 204 can select a minibatch B of samples j from its assigned inner loop. The calculation can be as follows:

$$d^s = \nabla f_j(w_t^{(s)}) - \nabla f_j(w_{t-1}^{(s)})$$

where $d^s$ is the determined gradient difference for outer loop iteration s and $\nabla f_j(w_t^{(s)})$ and $\nabla f_j(w_{t-1}^{(s)})$ (j∈ B) where j is the node weight that is a member of sample data minibatch B, t is the inner loop iteration and s is the outer loop iteration. Machine learning model optimization module 206 is a computer program that can be configured to update and optimize a machine learning model during training. In an embodiment, machine learning model optimization module 206 initializes one or more hyperparameters in a machine learning model or deep neural network. For example, in a deep neural network, all weights may be numbers between 0 and 1 and the weights associated with activating a node may be assigned randomly. Also, initial weights may be represented as follows: $\tilde{w}_0$, where $\tilde{w}_0$ is the initial distribution of weights or hyperparameters for the machine learning model.

In an embodiment, machine learning model optimization module 206 may utilize gradients to determine a search direction between the expected result and the result received during an inner loop iteration or outer loop iteration. For example, search direction can be calculated as follows:

$$v_0^s = \frac{1}{n} \sum_{i=1}^n v_{0,i}^s$$

for an outer loop, where $v_0^s$ is the search direction of outer loop iteration s for the current inner loop 0, for the sum of the initial search direction for outer loop iteration s at the i-th client for component function n.

In an embodiment, gradient calculation module 204 can be configured to determine the search direction for an inner loop based on the sum of previous search directions and the mini-batch of gradient differences $$v_t^{(s)} = \frac{1}{b} \sum_{j \in B} d_j^s + v_{t-1}^{(s)} \text{ and } d_j^s = \nabla f_j(w_t^{(s)}) - \nabla f_j(w_{t-1}^{(s)})$$

where B is the mini-batch and b is the mini-batch size.

In an embodiment, machine learning model optimization module 206 can determine if an inner loop is invoked. For example, if the value of the search direction for the current inner loop iteration is larger than the search direction of the previous iteration outer loop. The determination of the value of the search direction can be found in the following manner:

$$\|v_t^{(s)}\|^2 \geq \gamma \|v_0^{(s)}\|^2$$

where γ is a constant.

In an embodiment, machine learning model optimization module 206 can update the learning rate based on the calculated search direction of the inner loop. For example, if machine learning model optimization module 206 determines the value of the search direction is greater than or equal to the value of the previous inner loop iteration's search direction, machine learning model optimization module 206 can update the learning rate in the following manner:

$$\eta_t^{(s)} = \frac{1}{L} \cdot \frac{\|v_t^{(s)}\|^2}{\|v_0^{(s)}\|^2}$$

where η is the updated learning rate or step size of the inner loop for outer loop iteration s and L is the Lipschitz continuous gradient constant.

In an embodiment, machine learning model optimization module 206 can update a weight of a component part for the inner loop based on a learning rate and a search direction for the current inner loop. For example, the weight of the inner loop component part may be calculated as follows:

$$w_{t+1}^{(s)} = w_t^{(s)} - \eta_t^{(s)} v_t^{(s)}$$

where $w_{t+1}^{(s)}$ is the updated weight for outer loop iteration s and inner loop iteration t+1 (i.e., the next iteration for t). If the search direction is below some threshold, set $\tilde{w}_s = w_{t+1}^{(s)}$, where $\tilde{w}_s$ is the new weights for outer loop iteration s.

Figure 3:
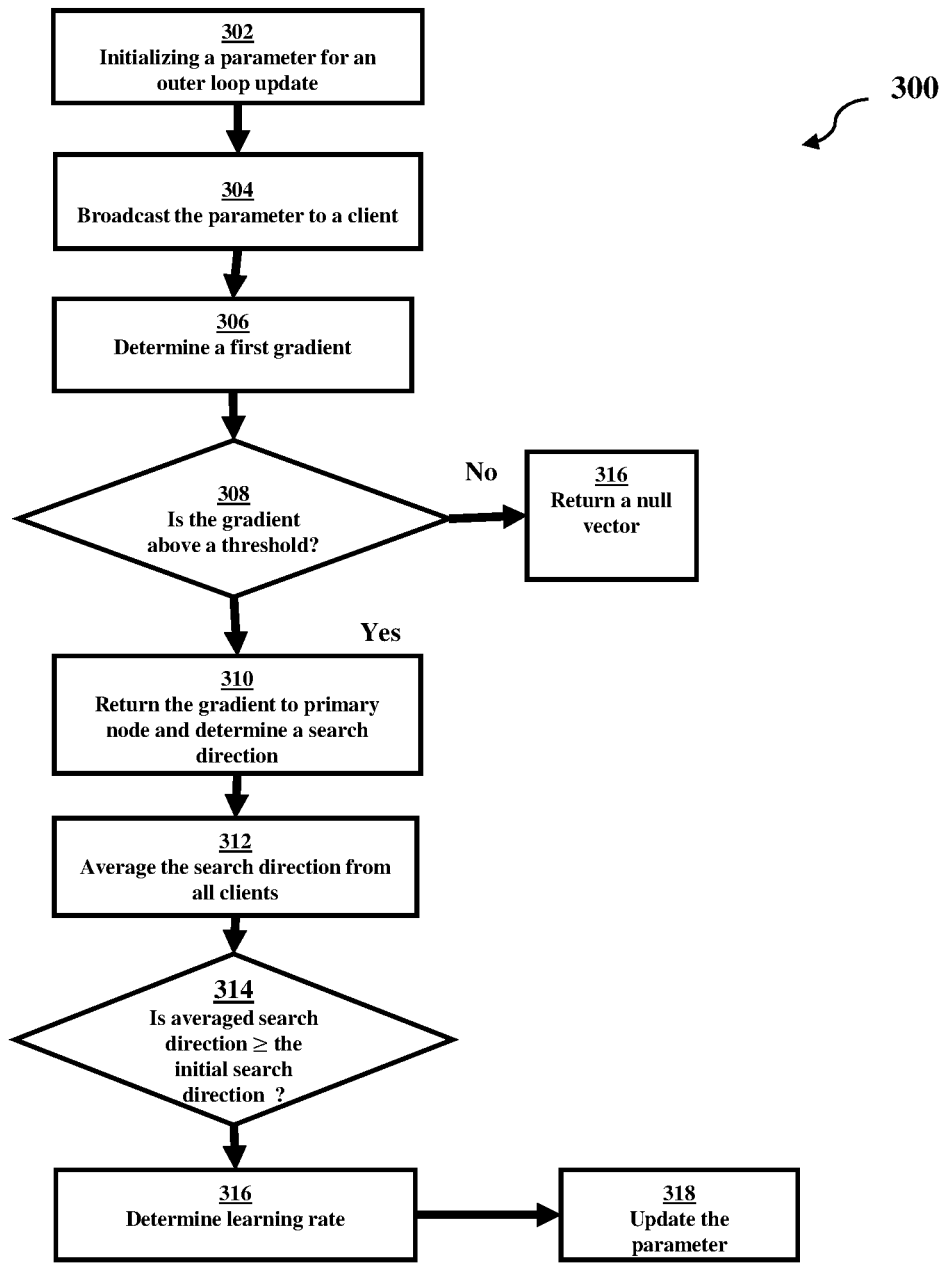
FIG. 3 is a flowchart depicting a method for federated deep neural network learning 300, in accordance with an embodiment of the present invention.

FIG. 3 is a flowchart depicting method 300 for federated learning for deep neural networks and machine learning models, in accordance with an embodiment of the present invention. At step 302, machine learning optimization module 206 can initialize a parameter for an outer loop update. At step 304, broadcast module 202 can broadcast the parameter to a client computing device (e.g., client A 104) from a primary computing device (e.g., server 102). At step 306, gradient calculation module 204 can determine a first gradient for the outer loop update from training data for the parameter. At decision step 308, broadcast module 202 determines if the gradient is above a threshold (e.g., higher than a ratio of previous gradients).

If broadcast module 202 determined the gradient is not above a threshold, at step 316, broadcast module 202 returns a null or zero vector to the primary computing device. If a null or zero vector is returned to the primary device.

At step 310, if the gradient is above a threshold, broadcast module 202 sends the gradient to a primary computing device (e.g., server 102). Machine learning model optimization module 206 can calculate a search direction based on the weight and the determined gradient. At step 312, machine learning model optimization module 206 can calculate the average search direction of all the gradients returned from any other clients. At step 314, determine if the averaged search direction is greater than or equal to the squared norm of an initial search direction multiplied by a predetermined factor between 0 and 1 and that the number of inner loop iterations is less than or equal a predetermined maximum inner loop size. At step 316, machine learning model optimization module 206 can determine the learning rate of the inner loop based on a random minibatch sample set of data at a client, where the sample set finds the inner loop direction and finds the search direction of the outer loop based on the inner loop direction search and the prior outer loop direction search. At step 318, update the parameter based on the new outer loop search direction. In another example, update the learning rate of inner loop for the stochastic gradient descent based on the search direction. Machine learning model optimization module 206 can update the parameter based on the search direction and the learning rate.

Figure 4:
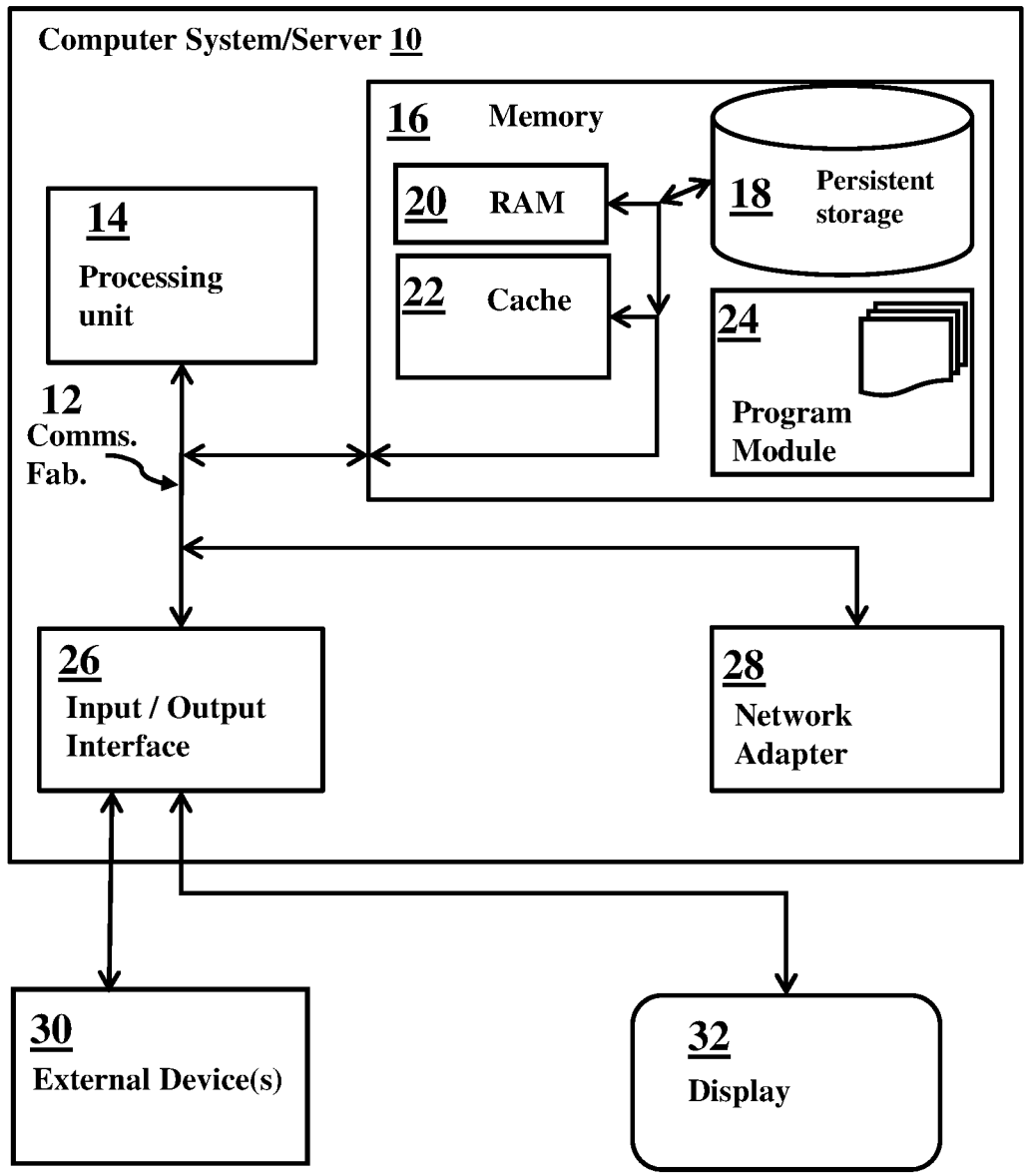
FIG. 4 is a functional block diagram of an exemplary computing system within federated deep neural network learning environment, in accordance with an embodiment of the present invention.

FIG. 4 depicts computer system 10, an example computer system representative of server 102 or any other computing device within an embodiment of the invention. Computer system 10 includes communications fabric 12, which provides communications between computer processor(s) 14, memory 16, persistent storage 18, network adaptor 28, and input/output (I/O) interface(s) 26. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Computer system 10 includes processors 14, cache 22, memory 16, network adaptor 28, input/output (I/O) interface(s) 26 and communications fabric 12. Communications fabric 12 provides communications between cache 22, memory 16, persistent storage 18, network adaptor 28, and input/output (I/O) interface(s) 26. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses or a crossbar switch.

Memory 16 and persistent storage 18 are computer readable storage media. In this embodiment, memory 16 includes persistent storage 18, random access memory (RAM) 20, cache 22 and program module 24. In general, memory 16 can include any suitable volatile or non-volatile computer readable storage media. Cache 22 is a fast memory that enhances the performance of processors 14 by holding recently accessed data, and data near recently accessed data, from memory 16. As will be further depicted and described below, memory 16 may include at least one of program module 24 that is configured to carry out the functions of embodiments of the invention.

The program/utility, having at least one program module 24, may be stored in memory 16 by way of example, and not limiting, as well as an operating system, one or more application programs, other program modules, and program data. Each of the operating systems, one or more application programs, other program modules, and program data or some combination thereof, may include an implementation of a networking environment. Program module 24 generally carries out the functions and/or methodologies of embodiments of the invention, as described herein.

Program instructions and data used to practice embodiments of the present invention may be stored in persistent storage 18 and in memory 16 for execution by one or more of the respective processors 14 via cache 22. In an embodiment, persistent storage 18 includes a magnetic hard disk drive. Alternatively, or in addition to a magnetic hard disk drive, persistent storage 18 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Network adaptor 28, in these examples, provides for communications with other data processing systems or devices. In these examples, network adaptor 28 includes one or more network interface cards. Network adaptor 28 may provide communications through the use of either or both physical and wireless communications links. Program instructions and data used to practice embodiments of the present invention may be downloaded to persistent storage 18 through network adaptor 28.

I/O interface(s) 26 allows for input and output of data with other devices that may be connected to each computer system. For example, I/O interface 26 may provide a connection to external devices 30 such as a keyboard, keypad, a touch screen, and/or some other suitable input device. External devices 30 can also include portable computer readable storage media such as, for example, thumb drives, portable optical or magnetic disks, and memory cards. Software and data used to practice embodiments of the present invention can be stored on such portable computer readable storage media and can be loaded onto persistent storage 18 via I/O interface(s) 26. I/O interface(s) 26 also connect to display 32.

Display 32 provides a mechanism to display data to a user and may be, for example, a computer monitor or virtual graphical user interface.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality and operation of possible implementations of systems, methods, and computer program products according to various embodiments of the present invention. In this regard, each block in the flowchart or block diagrams may represent a module, segment or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
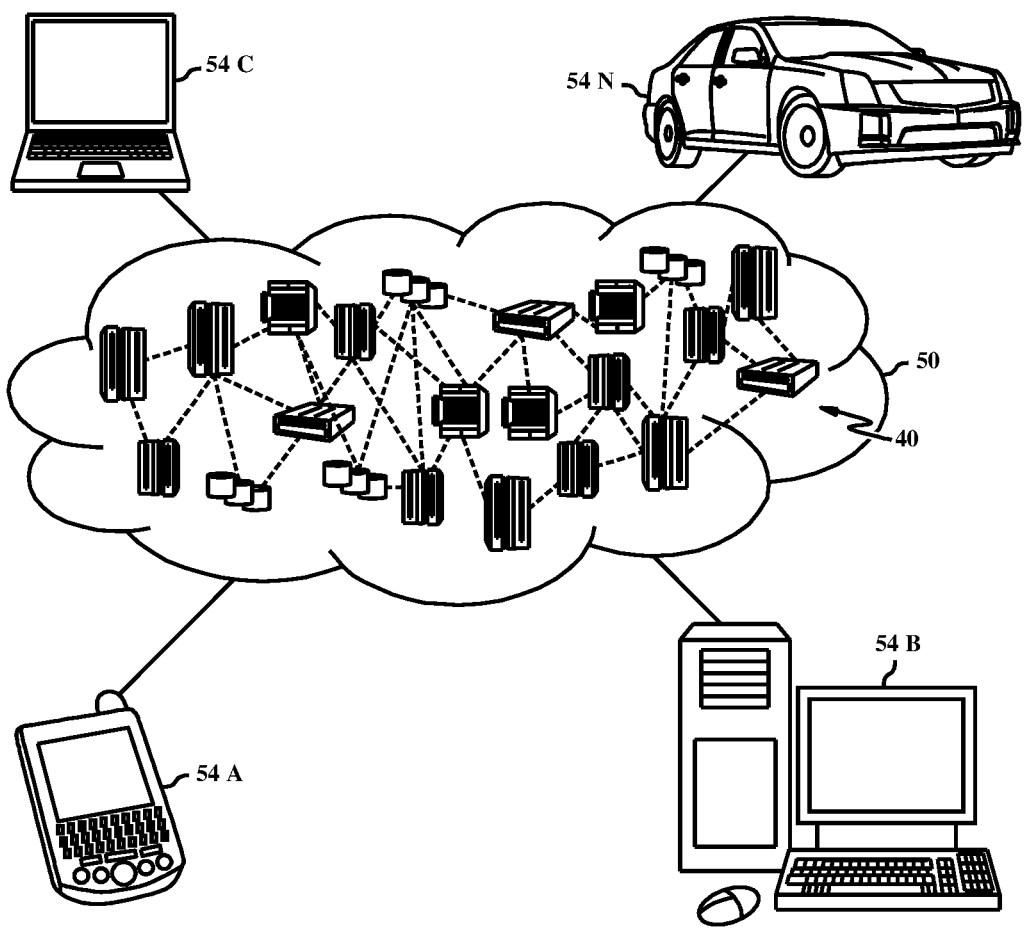
FIG. 5 is a diagram depicting a cloud computing environment, in accordance with an embodiment of the present invention.

FIG. 5 is a block diagram depicting a cloud computing environment 50 in accordance with at least one embodiment of the present invention. Cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
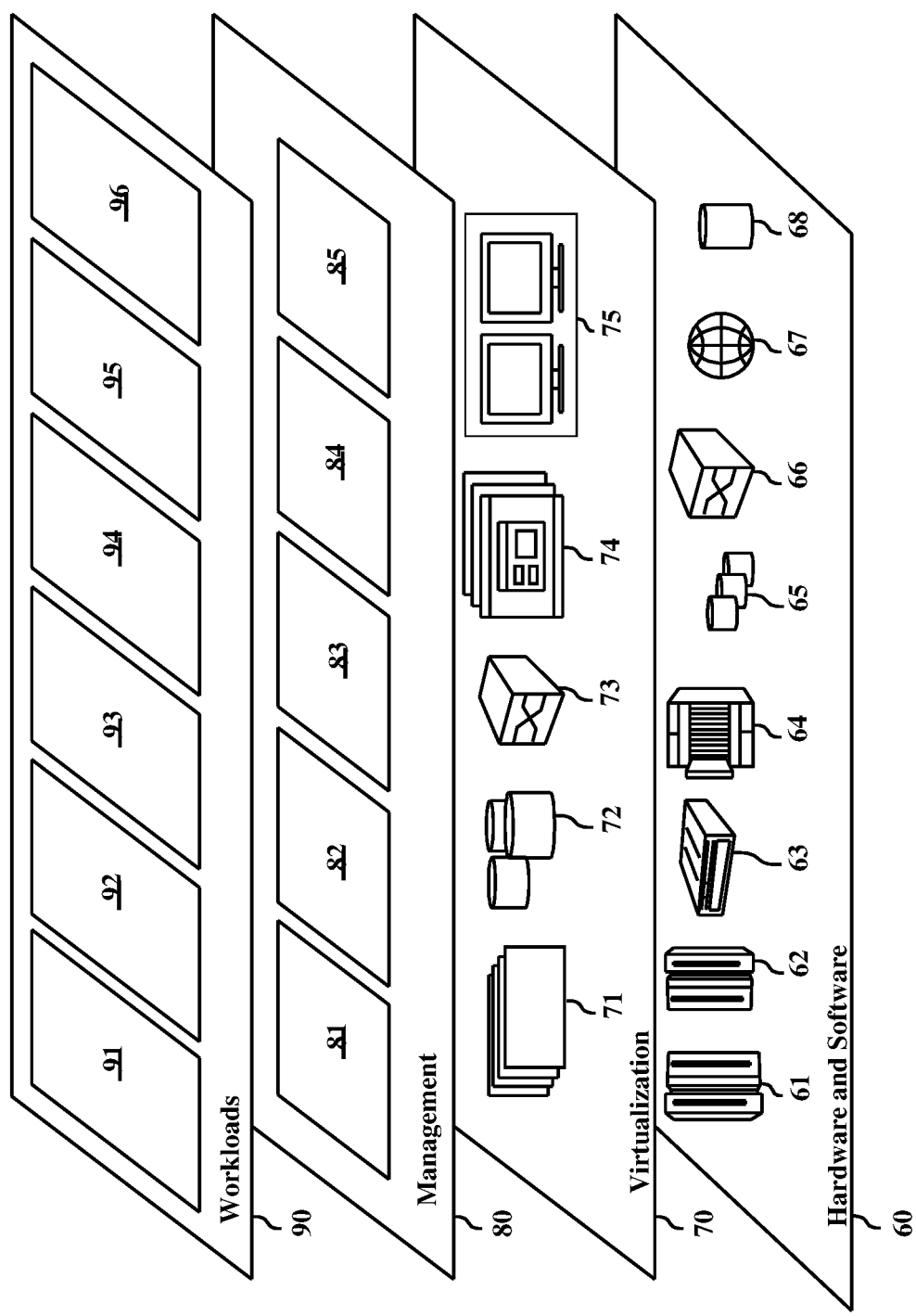
FIG. 6 is a functional block diagram depicting abstraction model layers, in accordance with an embodiment of the present invention.

FIG. 6 is a block diagram depicting a set of functional abstraction model layers provided by cloud computing environment 50 depicted in FIG. 5 in accordance with at least one embodiment of the present invention. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and federated learning for training machine learning models 96.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for training machine learning models through federated learning, the method comprising:
    initializing one or more machine learning model parameters for an outer loop update, wherein the one or more machine learning model parameters includes a weight associated with nodes within a deep learning neural network;
    broadcasting, by a primary server, the one or more machine learning model parameters to a plurality of clients;
    determining a first gradient for the one or more machine learning model parameters from a loss function at the plurality of clients;
    responsive to the first gradient being above a gradient threshold, returning the first gradient to the primary server;
    determining a condition for invoking an inner loop update based on a magnitude of an initial search direction for the inner loop being larger than a previous search direction for the outer loop;
    determining an updated search direction based on a mini-batch of gradient differences for an inner loop update;
    averaging the search directions for all clients for the outer loop update;
    responsive to a squared norm of the updated search direction being greater or equal than a squared norm of the initial search direction multiplied by a predetermined factor between 0 and 1 and a count of inner loop iterations is less than or equal a predetermined maximum inner loop size:
        determining a learning rate of the inner loop update for the machine learning model, based, at least in part, on the updated search direction by:
            determining a ratio of the updated search direction over the initial search direction; and
            multiplying the ratio against a reciprocal of a Lipschitz gradient constant of the first gradient; and
    updating the one or more machine learning model parameters of the inner loop based, at least in part, on the updated search direction and the determined learning rate.

2. The computer-implemented method of claim 1, further comprising:
    broadcasting the updated one or more machine learning model parameters to a client;
    determining a second gradient of the loss function for the updated one or more machine learning model parameters;
    identifying determining a previous the first gradient for the previous one or more machine learning model parameters;
    responsive to the second gradient and the first gradient being above the gradient threshold, determining a difference between the second gradient and the first gradient in an inner loop; and
    determining a next search direction based on a mini-batch of the determined differences.

3. The computer-implemented method of claim 2, further comprising:
    updating, by the processor, the updated one or more machine learning model parameters of an outer loop based at least in part on the next search direction.

4. The computer-implemented method of claim 1, further comprising:
    responsive to the first gradient being below the threshold:
        returning a first zero vector to the primary server; and
        stopping an update of the machine learning model parameter of the inner loop.

5. The computer-implemented method of claim 2, further comprising:
    responsive to the second gradient being below the gradient threshold, returning a second zero vector to the primary server.

6. A computer system for training machine learning models through federated learning, the system comprising:
    a memory; and
    a processor in communication with the memory, the processor being configured to perform operations comprising:
        initializing one or more machine learning model parameters for an outer loop update, wherein the one or more machine learning model parameters includes a weight associated with nodes within a deep learning neural network;
        broadcasting, by a primary server, the one or more machine learning model parameters to a plurality of clients;
        determining a first gradient for the one or more machine learning model parameters from a loss function at the plurality of clients;
        responsive to the first gradient being above a gradient threshold, returning the first gradient to the primary server;
        determining a condition for invoking an inner loop update based on a magnitude of an initial search direction for the inner loop being larger than a previous search direction for the outer loop;
        determining an updated search direction based on a mini-batch of gradient differences for an inner loop update;
        averaging the search directions for all clients for the outer loop update;
        responsive to a squared norm of the updated search direction being greater or equal than a squared norm of the initial search direction multiplied by a predetermined factor between 0 and 1 and a count of inner loop iterations is less than or equal a predetermined maximum inner loop size:
            determining a learning rate of the inner loop update for the machine learning model, based, at least in part, on the updated search direction by:

determining a ratio of the updated search direction over the initial search direction; and multiplying the ratio against a reciprocal of a Lipschitz gradient constant of the first gradient; and updating the one or more machine learning model parameters of the inner loop based, at least in part, on the updated search direction and the determined learning rate.

7. The computer system of claim 6, the processor being configured to perform operations comprising:

broadcasting the updated one or more machine learning model parameters to a client;

determining a second gradient of the loss function for the updated one or more machine learning model parameters;

identifying the first gradient for the one or more machine learning model parameters;

responsive to the second gradient and the first gradient being above the gradient threshold, determining a difference between the second gradient and the first gradient in an inner loop; and determining a next search direction based on a mini-batch of the determined differences.

8. The computer system of claim 7, the processor being configured to perform operations comprising:

updating the updated one or more machine learning model parameters of an outer loop based at least in part on the next search direction.

9. The computer system of claim 6, the processor being configured to perform operations comprising:

responsive to the first gradient being below the threshold; returning a first zero vector to the primary server; and stopping an update of the machine learning model parameter of the inner loop.

10. The computer system of claim 7, the processor being configured to perform operations comprising:

responsive to the second gradient being below the gradient threshold, returning a second zero vector to the primary server.

11. A computer program product for training machine learning models through federated learning, the computer program product comprising a computer readable storage medium and program instructions stored thereon, the program instructions executable by a processor to cause the processors to perform a function, the function comprising:

initializing one or more machine learning model parameters for an outer loop update, wherein the one or more machine learning model parameters includes a weight associated with nodes within a deep learning neural network;

broadcasting, by a primary server, the one or more machine learning model parameters to a plurality of clients;

determining a first gradient for the one or more machine learning model parameters from a loss function at the plurality of clients;

responsive to the first gradient being above a gradient threshold, returning the first gradient to the primary server;

determining a condition for invoking an inner loop update based on a magnitude of an initial search directions in direction for the inner loop being larger than a previous search direction for the outer loop;

determining a an updated search direction based on a mini-batch of gradient differences for an inner loop update;

averaging the search directions for all clients for the outer loop update;

responsive to a squared norm of the updated search direction being greater or equal than a squared norm of the initial search direction multiplied by a predetermined factor between 0 and 1 and a count of inner loop iterations is less than or equal a predetermined maximum inner loop size:

determining a learning rate of the inner loop update for the machine learning model, based, at least in part, on the updated search direction by:

determining a ratio of the updated search direction over the initial search direction; and multiplying the ratio against a reciprocal of a Lipschitz gradient constant of the first gradient; and updating the one or more machine learning model parameters of the inner loop based, at least in part, on the updated search direction and the determined learning rate.

12. The computer program product of claim 11, the function further comprising:

broadcasting the updated one or more machine learning model parameters to a client;

determining a second gradient of the loss function for the updated one or more machine learning model parameters;

identifying the first gradient for the one or more machine learning model parameters;

responsive to the second gradient and the first gradient being above the gradient threshold, determining a difference between the second gradient and the first gradient in an inner loop; and determining a next search direction based on a mini-batch of the determined differences.

13. The computer program product of claim 12, the function further comprising:

updating the updated one or more machine learning model parameters of an outer loop based at least in part on the next search direction.

14. The computer program product of claim 11, the function further comprising:

responsive to the first gradient being below the threshold: returning a first zero vector to the primary server; and stopping an update of the machine learning model parameter of the inner loop.

15. The computer program product of claim 12, the function further comprising:

responsive to the second gradient being below the gradient threshold, returning a second zero vector to the primary server.

* * * * *